United States Patent
Sugiyama et al.

(10) Patent No.: US 8,387,595 B2
(45) Date of Patent: Mar. 5, 2013

(54) LUBRICATING DEVICE FOR FOUR-STROKE ENGINE

(75) Inventors: Masaki Sugiyama, Numazu (JP); Tetsuya Hasegawa, Numazu (JP)

(73) Assignee: Makita Corporation, Anjo (JP)

( * ) Notice: Subject to any disclaimer, the term of this patent is extended or adjusted under 35 U.S.C. 154(b) by 84 days.

(21) Appl. No.: 13/177,311

(22) Filed: Jul. 6, 2011

(65) Prior Publication Data
US 2012/0017865 A1    Jan. 26, 2012

(30) Foreign Application Priority Data
Jul. 22, 2010   (JP) .................................. 2010-165264

(51) Int. Cl.
*F01M 1/06*    (2006.01)

(52) U.S. Cl. .................................... 123/572; 123/196 R

(58) Field of Classification Search .......... 123/572–574, 123/41.86, 90.33–90.38, 196 R
See application file for complete search history.

(56) References Cited

U.S. PATENT DOCUMENTS

| | | | | |
|---|---|---|---|---|
| 5,960,764 A | * | 10/1999 | Araki | 123/196 R |
| 6,508,224 B2 | | 1/2003 | Ito et al. | |
| 6,672,273 B2 | | 1/2004 | Ito et al. | |
| 6,877,474 B2 | * | 4/2005 | Radel | 123/196 R |
| 8,225,774 B2 | * | 7/2012 | Chen et al. | 123/572 |
| 2001/0029910 A1 | | 10/2001 | Ito et al. | |
| 2003/0079704 A1 | | 5/2003 | Ito et al. | |
| 2003/0079711 A1 | | 5/2003 | Ito et al. | |
| 2009/0013959 A1 | * | 1/2009 | Lin | 123/196 M |
| 2011/0067659 A1 | | 3/2011 | Sugiyama et al. | |

FOREIGN PATENT DOCUMENTS

JP    A-2002-147213    5/2002
JP    A-2011-069241    4/2011

* cited by examiner

*Primary Examiner* — M. McMahon
(74) *Attorney, Agent, or Firm* — Oliff & Berridge, PLC

(57) ABSTRACT

A lubricating device for a four-stroke engine is provided that circulates oil while lubricating each part in a valve operating chamber and a crank chamber by supplying the oil to the valve operating chamber and the crank chamber using pressure fluctuation in the crank chamber, the pressure fluctuation being caused by reciprocating motion of a piston. The valve operating chamber is formed by mounting a valve operating chamber cover, and a suction passageway that sucks the oil in the valve operating chamber is provided by forming a groove on an inner surface of the valve operating chamber cover and sealing the groove with a sealing member shaped to fit the groove.

6 Claims, 8 Drawing Sheets

LUBRICATING DEVICE FOR FOUR-STROKE ENGINE

BACKGROUND

1. Field of the Invention

The present invention relates to a lubricating device for a four-stroke engine, more specifically relates to a lubricating device for a four-stroke engine that allows lubricating oil to circulate in an engine even if it is tilted in different directions in use.

2. Description of the Related Art

Engines are used as driving sources for working machines, such as a brush cutter or trimmer, and a backpack working machine to be carried by hand or on the back of an operator in use. Generally, engines are classified into two-stroke engines and four-stroke engines, and in recent years, there has been increasing demand for four-stroke engines as driving sources because of increase in public awareness of environmental issues and tightening of emission regulations.

A four-stroke engine needs a larger number of components than a two-stroke engine, and therefore increases in weight. Accordingly, an engine for, in particular, a mobile working machine is required to decrease in weight because an operator works carrying the working machine in necessity.

Thus, with the aim of providing a lightweight four-stroke engine, a lubricating device for a four-stroke engine is disclosed, for example, in Japanese Patent Application Laid-Open Publication No. 2002-147213, which allows lubricating oil to circulate using pressure fluctuation in a crank chamber without providing a lubricating pump separately.

This lubricating device has a first oil passageway provided to penetrate a crank axle that allows an oil tank and a crank chamber to communicate with one another. The lubricating device lubricates around the crank axle by supplying mist oil generated in the oil tank to the crank chamber using a state in which a negative pressure is created in the crank chamber.

Then, the mist oil generated in the oil tank and scattering is fed to driving parts, such as a power transmission mechanism (including an intake valve and an exhaust valve) in a first valve operating chamber and a cam mechanism in a second valve operating chamber arranged above the oil tank when the four-stroke engine stands upright, by using a state in which a positive pressure is created in the crank chamber, so that those driving parts are lubricated.

This lubricating device is configured to suck oil accumulated in the valve operating chamber through a siphon and return the oil to the crank chamber when a piston moves with rotation of the crank axle to create a negative pressure in the crank chamber.

Generally, the concentration of mist oil should be high around the crank axle, and the concentration of the mist oil in the power transmission mechanism and the valve operating mechanism including a cam provided in the valve operating chambers may be lower than the concentration of the mist oil around the crank axle.

However, in the lubricating device disclosed in the above-described patent document, the mist oil generated in the oil tank is supplied to the crank chamber and the valve operating chamber, and therefore the concentration of the mist oil supplied to the valve operating mechanism is substantially the same as the concentration of the mist oil supplied to the crank chamber.

Consequently, there is a technical problem that it is not possible to sufficiently lubricate around the crank axle unless a sufficient amount of mist oil is generated and supplied. In addition, there is another technical problem that if mist oil is supplied too much to the valve operating chamber, an amount of oil remaining in the valve operating chamber increases excessively, and therefore oil is discharged in large quantities while discharging blowby gas to a combustion chamber, so that oil can be consumed fast.

To solve the technical problems involved in the above-described patent document, Japanese Patent Application No. 2009-219044 filed by the applicants of the present application discloses a technique for a lubricating device for a four-stroke engine in which an inner cover having approximately the same shape as a valve operating chamber cover is provided in the valve operating chamber cover, and a gap is formed between the valve operating chamber cover and the inner cover to provide a passageway to collect oil accumulated in the valve operating chamber.

Incidentally, in the four-stroke engine disclosed in Japanese Patent Application No. 2009-219044, a cylinder head and a cylinder block are integrally formed. Here, when the cylinder head and the cylinder block are formed separately, bolt holes to penetrate bolts are required in the cylinder head to mount the cylinder head to the cylinder block.

In this way, bolt holes are required in the cylinder head, and therefore the mounting location and the size of the valve operating chamber cover to be mounted to the cylinder head are limited. Then, these limitations of the mounting location and the size of the valve operating chamber cover limit the size of the inner cover naturally, and therefore may influence valves provided inside the inner cover.

SUMMARY

Therefore, it is an advantage of an aspect of the present invention to reduce a valve operating chamber in size and provide a lubricating device for a four-stroke engine. The lubricating device includes an oil collecting passageway which has a structure suitable for fabrication and can improve the efficiency of collecting oil accumulated in the valve operating chamber even if, in particular, a cylinder head and a cylinder block are formed separately in a four-stroke engine.

According to a first aspect of the present invention, a lubricating device for a four-stroke engine is provided that circulates oil while lubricating each part in a valve operating chamber and a crank chamber, the valve operating chamber accommodating an intake valve and an exhaust valve, by supplying the oil to the valve operating chamber and the crank chamber using pressure fluctuation in the crank chamber, the pressure fluctuation being caused by reciprocating motion of a piston, and discharges blowby gas contained in a circulation path through which the oil circulates, from the valve operating chamber to a combustion chamber via a breather passageway connected to the valve operating chamber. The valve operating chamber is formed by mounting a valve operating chamber cover. A suction passageway that sucks the oil in the valve operating chamber is provided by forming a groove on an inner surface of the valve operating chamber cover and sealing the groove with a sealing member shaped to fit the groove.

According to a second aspect of the present invention, the valve operating chamber cover in the lubricating device for a four-cycle engine has a top plate part and is shaped as a cap by providing a side plate part along the periphery of the top plate part. A rim formed at the border between the top plate part and the side plate part serves as the groove.

According to a third aspect of the present invention, the valve operating chamber cover in the lubricating device for a four-cycle engine has a top plate part having an approximately polygonal shape and is shaped as a cap by providing a plurality of side plate parts along the periphery of the top plate part. A rim formed at the boundary between neighboring side plate parts serves as the groove.

According to a fourth aspect of the present invention, an opening of the suction passageway in the lubricating device for a four-stroke engine is formed near a surface on which the valve operating chamber cover is mounted.

According to a fifth aspect of the present invention, the groove in the lubricating device for a four-stroke engine has a step part and is sealed by fitting the sealing member into the step part.

According to a six aspect of the present invention, a lubricating device for a four-stroke engine is provided that circulates oil while lubricating each part in a valve operating chamber and a crank chamber, the valve operating chamber accommodating an intake valve and an exhaust valve, by supplying the oil to the valve operating chamber and the crank chamber using pressure fluctuation in the crank chamber, the pressure fluctuation being caused by reciprocating motion of a piston, and discharges blowby gas contained in a circulation path through which the oil circulates, from the valve operating chamber to a combustion chamber via a breather passageway connected to the valve operating chamber. The combustion chamber is formed by a cylinder head and a cylinder block provided as separate parts. The cylinder head and the cylinder block are coupled via a mounting part. The valve operating chamber is formed by mounting a valve operating chamber cover on the cylinder head avoiding the mounting part. A suction passageway to suck the oil in the valve operating chamber is provided by forming a groove on an inner surface of the valve operating chamber cover and sealing the groove with a sealing member shaped to fit the groove.

According to the present invention, it is possible to reduce a valve operating chamber in size, and provide a lubricating device for a four-stroke engine that includes an oil collecting passageway which has a structure suitable for fabrication and can improve the efficiency of collecting oil accumulated in the valve operating chamber even if, in particular, a cylinder head and a cylinder block are formed separately in a four-stroke engine.

In addition, according to the present invention, it is possible to secure the capacity of the valve operating chamber by covering only suction passageway grooves formed on the inner surface of the valve operating chamber cover, with a sealing member. By this means, it is possible to secure the capacity for accommodating coupling members to couple the cylinder head and the cylinder block with one another, which are formed separately in the four-stroke engine.

DETAILED DESCRIPTION

Figure 1:
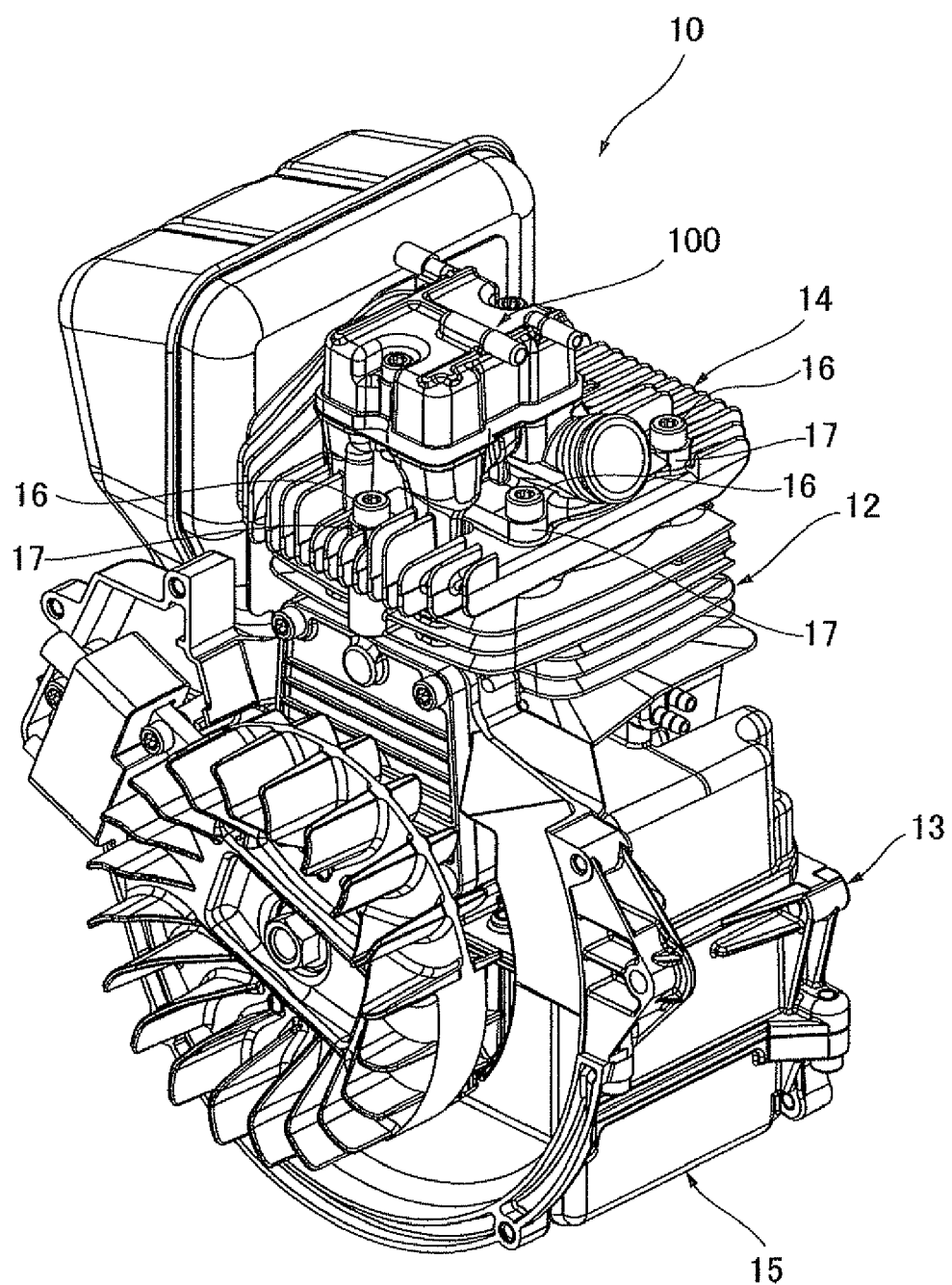
FIG. 1 is an external perspective view schematically showing the configuration of a four-stroke engine according to one embodiment of the present invention.

In the present embodiment, a lubricating device for a four-stroke engine 10 supplies oil to a crank chamber 13a, a valve operating mechanism chamber 20 and a valve operating chamber 30 using pressure fluctuation in the crank chamber 13a due to reciprocating motion of a piston 11, and circulates the oil while lubricating the crank chamber 13a, the valve operating mechanism chamber 20 and the valve operating chamber 30 with the oil.

In addition, the lubricating device for the four-stroke engine 10 discharges blowby gas contained in a circulation path through which oil circulates, from the valve operating chamber 30 to a combustion chamber through a breather passageway 103 described later, which is connected to the valve operating chamber 30.

Now, an exemplary embodiment of the present invention will be described in detail with reference to drawings. First, the configuration of the four-stroke engine 10 according to the present embodiment will be described with reference to FIG. 1 and FIG. 2. FIG. 1 is an external perspective view schematically showing the configuration of the four-stroke engine 10 according to one embodiment of the present invention, and FIG. 2 schematically explains the configuration of the lubricating device for the four-stroke engine 10 according to one embodiment of the present invention.

Figure 2:
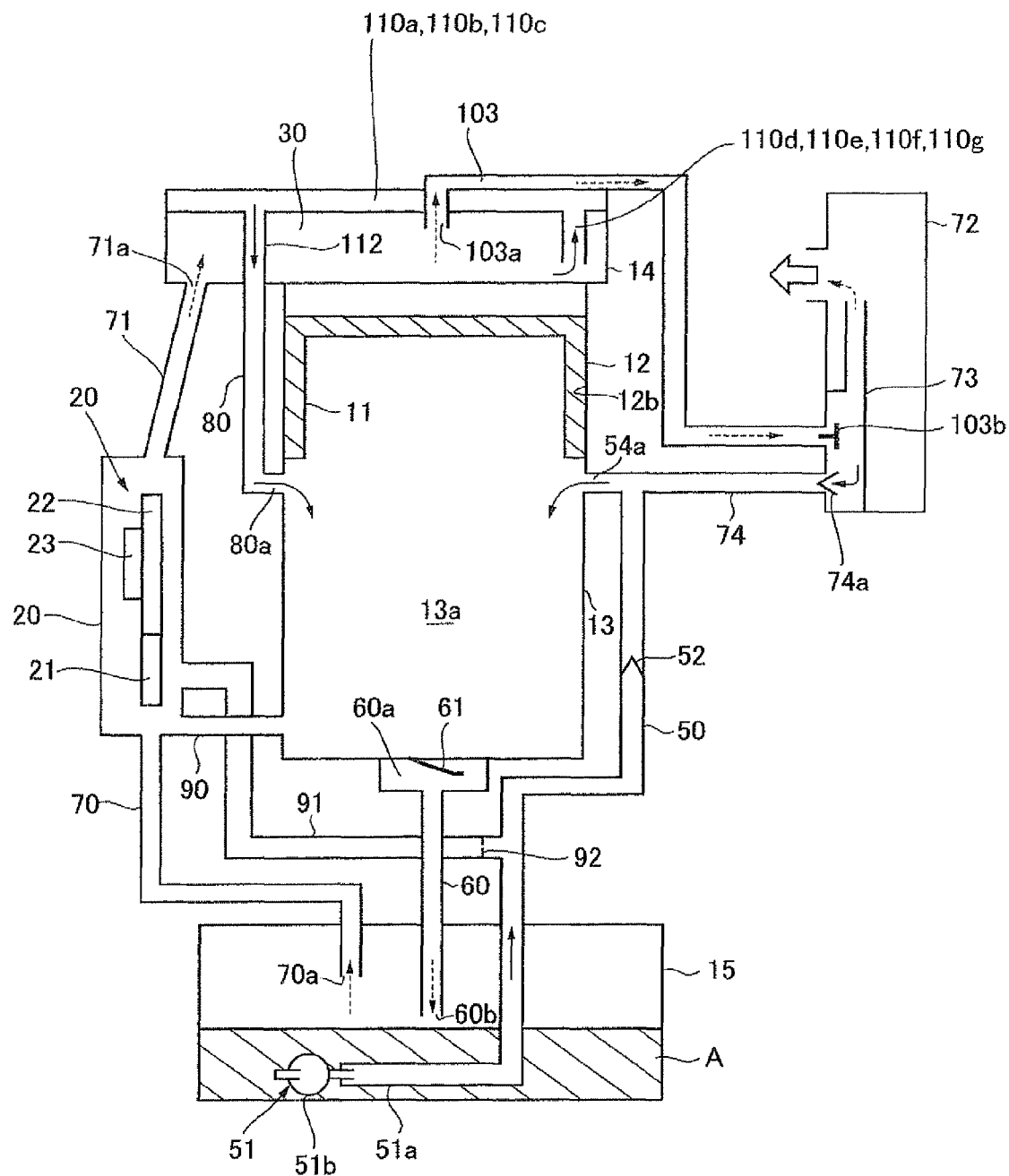
FIG. 2 schematically explains the configuration of a lubricating device for a four-stroke engine according to one embodiment of the present invention.
Figure 3:
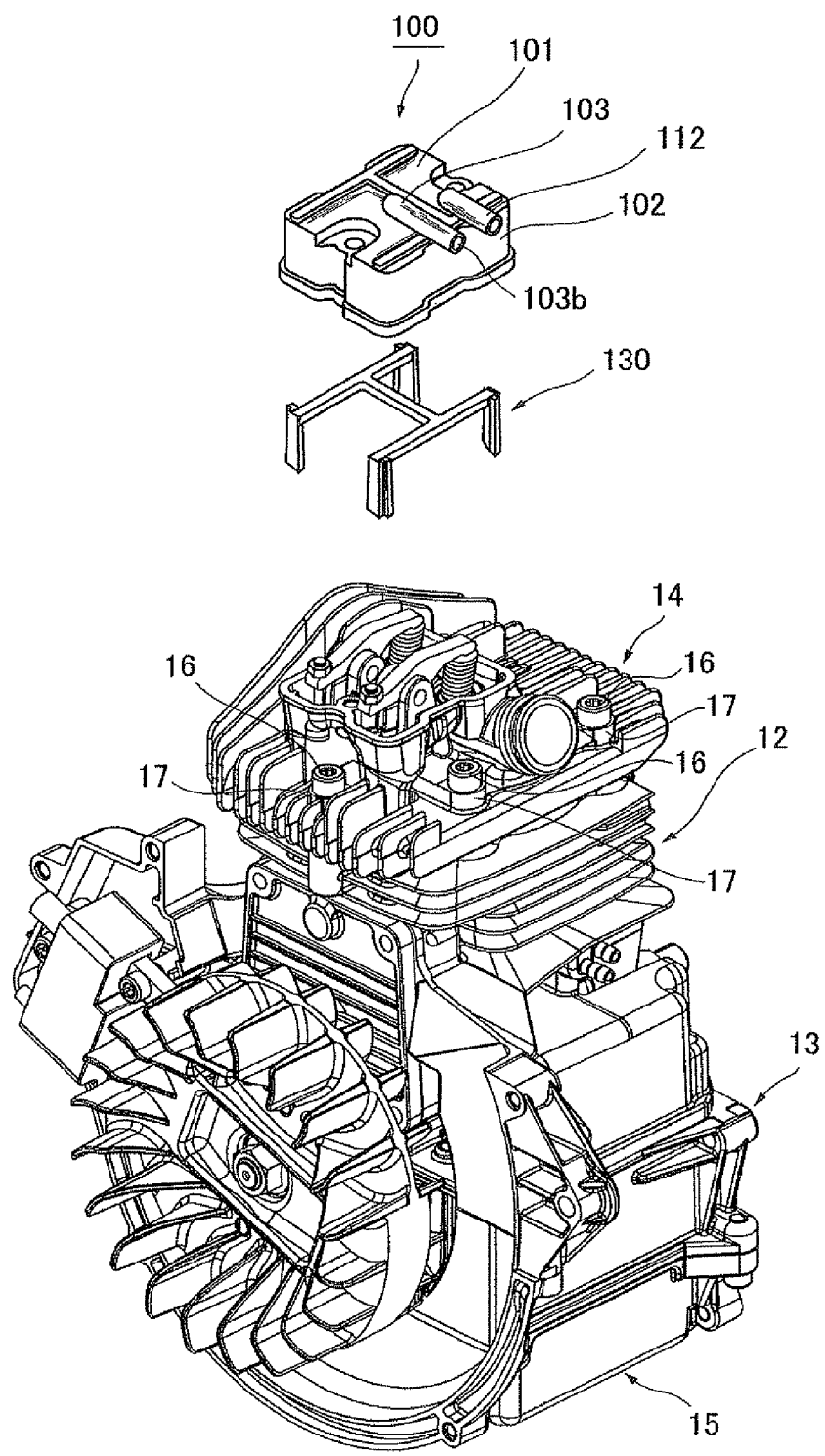
FIG. 3 is an exploded perspective view schematically showing a state of the four-stroke engine according to one embodiment of the present invention, where a valve operating chamber cover and a sealing member are removed from a cylinder head and detached from one another.

As illustrated in FIG. 1 and FIG. 2, this four-stroke engine 10 has: a cylinder block 12 that supports a piston 11 to move upward and downward; a crank case 13 that is disposed in the same side as one end side of the cylinder block 12 in the longitudinal direction and forms a crank chamber 13a; and a cylinder head 14 that is disposed in the same side as the other end side of the cylinder block 12 in the longitudinal direction and forms a combustion chamber with the cylinder block 12.

In the present embodiment, the cylinder block 12, the crank case 13 and the cylinder head 14 are formed separately, and, for example, the cylinder block 12 and the cylinder head 14 are coupled using a plurality of mounting bolts 16. Then, an oil tank 15 that stores oil is provided below the crank case 13.

The crank case 13 is provided in one end side of the cylinder block 12 as described above, and a crank axle is rotatably supported by the crankcase 13 and the cylinder block 12. Then, the piston 11 connected to a crank pin in the crank axle via a connecting rod, is inserted in a cylinder 12b provided in the cylinder 12, where the piston 11 can move upward and downward.

In addition, the crank chamber 13a is formed in the crank case 13 as described above. The crank shaft in the crank axle is rotatably supported in the crank chamber 13a such that both ends of the crank shaft project from the crank chamber 13a. This crank shaft is connected to the piston 11 via the connecting rod, and reciprocating motion of the piston 11 is converted into rotational motion of the crank shaft via the connecting rod.

Meanwhile, the cylinder head 14 is provided in the same side as the other end side of the cylinder block 12 in the longitudinal direction as described above. The cylinder block 12 and the cylinder head 14 are fixed to one another by fitting a plurality of mounting bolts 16 into mounting bosses 17. Then, the valve operating chamber 30 is formed in the cylinder head 14 avoiding the mounting bosses 17.

An intake port and an exhaust port communicating with a carburetor and an exhaust muffler, respectively, are provided in the valve operating chamber 30 formed by the cylinder head 14. These intake port and exhaust port have an intake valve and an exhaust valve to open and close the intake port and the exhaust port, respectively.

These intake valve and exhaust valve are connected to a valve operating mechanism for driving the intake valve and the exhaust valve. The valve operating mechanism for driving the intake valve and the exhaust valve has: a valve driving gear 21 fixed to the crank axle; a cam gear 22 driven by the valve driving gear 21; a cam 23 connected to one end of the cam gear 22; a pair of cam followers swung by the cam 23 and rotatably supported by the cylinder block 12; a rocker arm provided in the cylinder head 14; a pair of push rods whose one end contacts the rocker arm; and a valve spring that biases the intake valve and the exhaust valve in the direction to close each valve.

The valve driving gear 21, the cam gear 22 and the cam 23 constituting the valve operating mechanism are accommodated in the valve operating mechanism chamber 20. Then, the rocker arm and the valve spring are accommodated in the valve operating chamber 30. A first supply passageway 70 and a second supply passageway 71 are connected to both ends of valve operating mechanism chamber 20, respectively. That is, valve operating mechanism chamber 20 is connected to the oil tank via the first supply passageway 70 and connected to the valve operating chamber 30 via the second supply passageway 71.

Therefore, when the oil tank 15 supplies mist oil to the valve operating chamber 30, the valve driving gear 21, the cam gear 22 and the cam 23 are lubricated. In addition, a valve operating chamber cover 100 is provided to cover the valve operating chamber 30 in the cylinder head 14 to protect the valve operating chamber 30. Moreover, a sealing member 130 is provided on the inner surface of the valve operating chamber cover 100.

Figure 4:
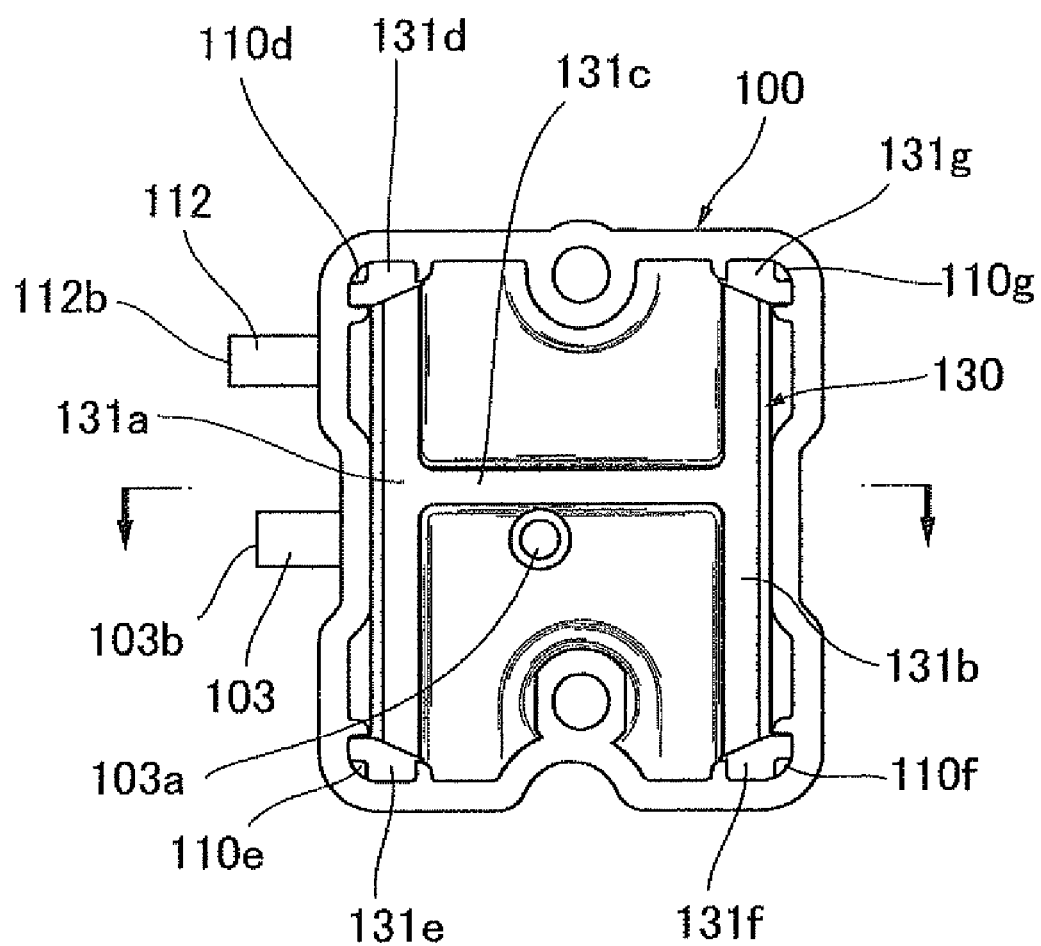
FIG. 4 is a rear view schematically showing an internal state in which the valve operating chamber cover and the sealing member are assembled in the four-stroke engine according to one embodiment of the present invention.
Figure 5:
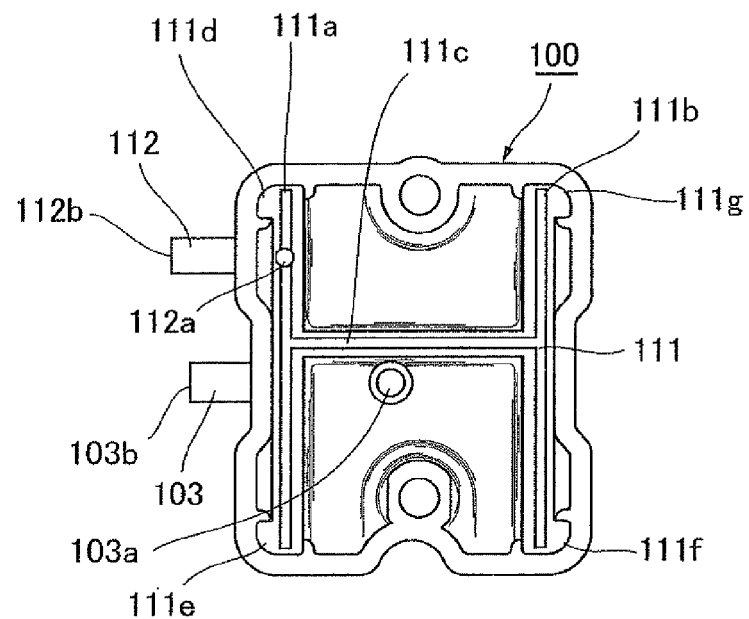
FIG. 5 is a rear view schematically showing the interior of the valve operating chamber cover in the four-stroke engine according to one embodiment of the present invention.
Figure 6:
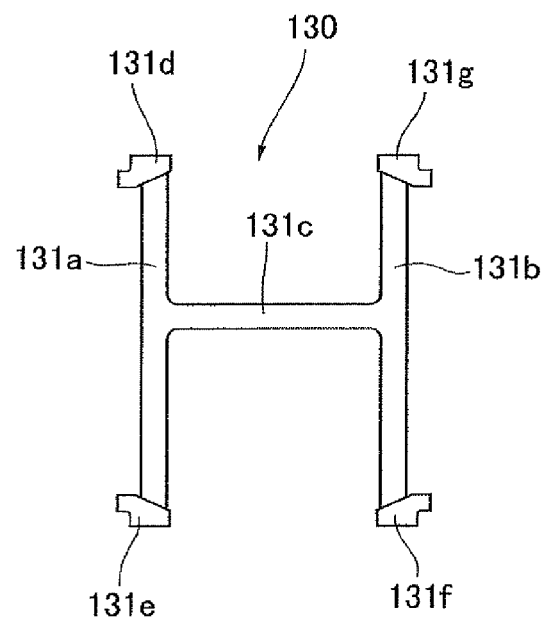
FIG. 6 is a rear view schematically showing the interior of the sealing member in the four-stroke engine according to one embodiment of the present invention.
Figure 7:
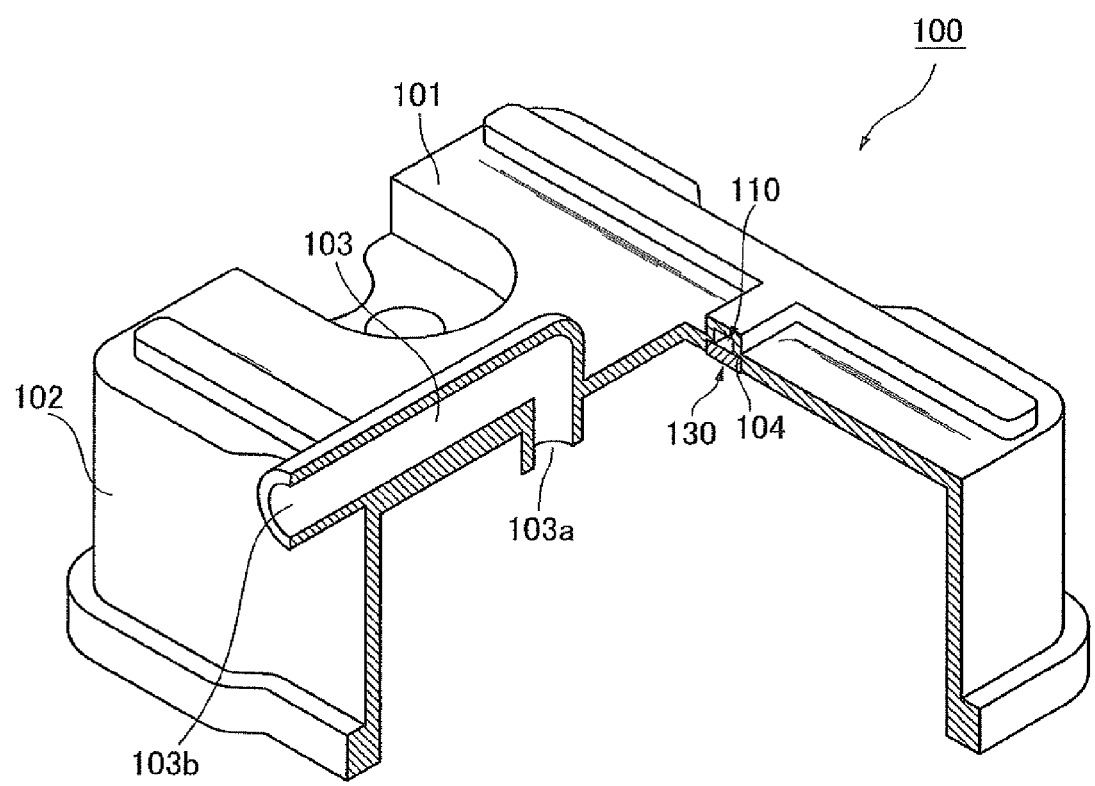
FIG. 7 is a perspective view schematically showing part of a cross section of the valve operating chamber cover and the sealing member in the four-stroke engine of the present invention in one direction.
Figure 8:
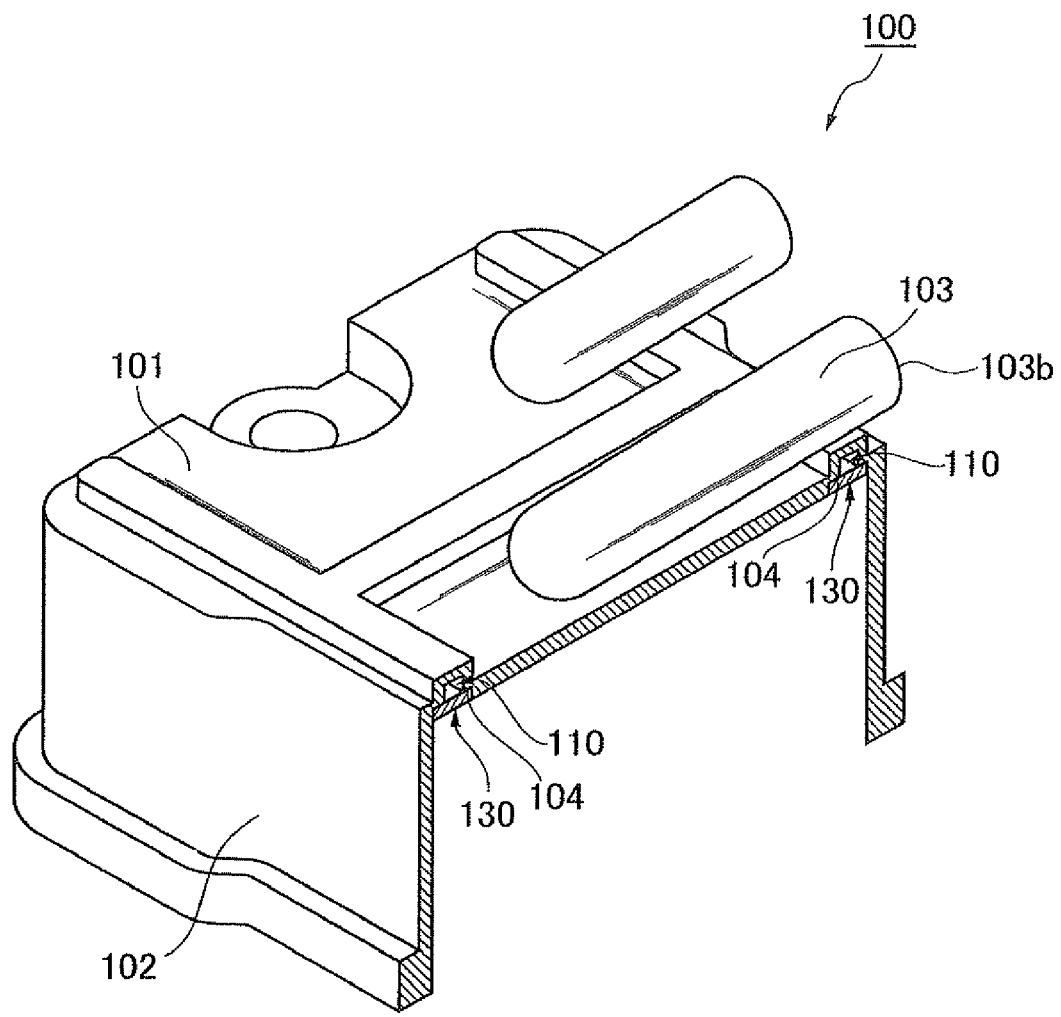
FIG. 8 is a perspective view schematically showing part of a cross section of the valve operating chamber cover and the sealing member in the four-stroke engine of the present invention in another direction.
Figure 9:
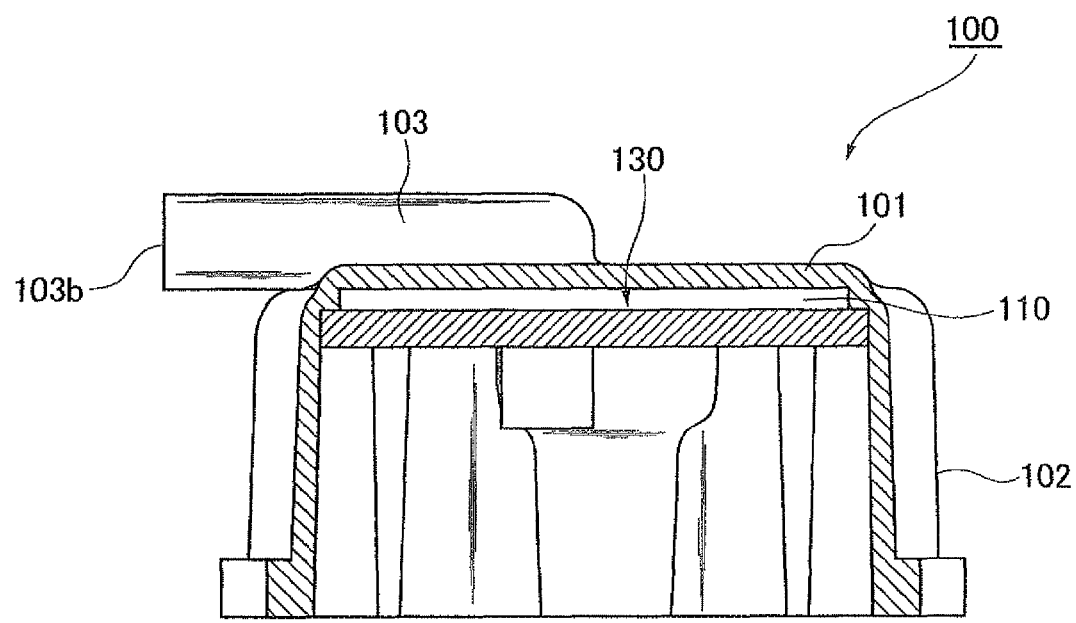
FIG. 9 is an end view schematically showing part of a cross section of the valve operating chamber cover and the sealing member in the four-stroke engine of the present invention in another direction.

Now, the valve operating chamber cover 100 and the sealing member 130 according to the present embodiment will be described with reference to FIG. 4 to FIG. 9. FIG. 4 is a rear view schematically showing an internal state in which the valve operating chamber cover 100 and the sealing member 130 are assembled in the four-stroke engine 10 according to one embodiment of the present invention. FIG. 5 is a rear view schematically showing the interior of the valve operating chamber cover 100 in the four-stroke engine 10 according to one embodiment of the present invention. FIG. 6 is a rear view schematically showing the interior of the sealing member 130 in the four-stroke engine 10 according to one embodiment of the present invention. FIG. 7 is a perspective view schematically showing part of a cross section of the valve operating chamber cover 100 and the sealing member 130 in the four-stroke engine 10 of the present invention in one direction. FIG. 8 is a perspective view schematically showing part of a cross section of the valve operating chamber cover 100 and the sealing member 130 in the four-stroke engine 10 of the present invention in another direction. FIG. 9 is an end view schematically showing part of a cross section of the valve operating chamber cover 100 and the sealing member 130 in the four-stroke engine 10 of the present invention in another direction.

In the present embodiment, the valve operating chamber cover 100 has a rectangular top plate part 101 and a side plate part 102 arranged along the periphery of the top plate part 101 and extending in the direction approximately orthogonal to the top plate part 101. That is, the valve operating chamber cover 100 has a cross section like substantially a cap. Here, the side plate part 102 does not necessarily need to extend in the direction approximately orthogonal to the top plate part 101, but may extend outward from the top plate part 101.

A breather passageway 103 is provided on the top plate part 101 in the valve operating chamber cover 100. The breather passageway 103 whose one side extends from the top plate part 101 into the valve operating chamber cover 100, and an opening end 103a of the one end side is located at approximately the center of the valve operating chamber 30 in a state in which the valve operating chamber cover 100 is fixed to the cylinder head 14.

Meanwhile, the other end side of the breather passageway 103 extends along a surface of the top plate part 101, and an opening end 103b of the other end side projects outward from the side plate part 102.

In the present embodiment, a suction passageway 110 to suck oil in the valve operating chamber 30 is provided on the inner surface of the valve operating chamber cover 100. The suction passageway 100 is composed of suction passageway groove 111 on the inside of the inner surface of the valve operating chamber cover 100 and the sealing member 130 that seals the suction passageway groove 111.

The suction passageway groove 111 has a first longitudinal side groove 111a and a second longitudinal side groove 111b located along the longitudinal sides of the circumference of the rear surface of the top plate part 101 in the valve operating chamber cover 100, a connection groove 111c that connects the first longitudinal side groove 111a and the second longitudinal side groove 111b, and side plate grooves 111d, 111e, 111f and 111g connected to both ends of the first longitudinal side groove 111a and both ends of the second longitudinal side groove 111c, respectively, and located in the four corners of the side plate part 102 in the valve operating chamber cover 100.

An opening end part 112a of a communicating passageway 112 is connected to the first longitudinal side groove 111a to communicate with one another, and the other end part 112b of the communicating passageway 112 is disposed to project outward from the side plate part 102. In the present embodiment, the first longitudinal side groove 111a, the second longitudinal side groove 111b and the connection groove 111c each have a step part 104.

As illustrated in FIG. 7 and FIG. 8, when the valve operating chamber cover 100 is seen in cross section, the step part 104 is formed as a step. That is, each suction passageway groove 111 has a narrower part serving as the suction passageway 110 and a wider part to accommodate the sealing member 130. This allows the sealing part 130 to easily be fitted into the suction passageway groove 111 along the step parts 104.

The sealing means 130 according to the present embodiment is arranged to cover the suction passageway groove 111 in the valve operating chamber cover 100. That is, the sealing member 130 has a first longitudinal side part 131a that covers the first longitudinal side groove 111a in the suction passageway groove 111, a second longitudinal side part 131b that covers the second longitudinal side groove 111b, a connection part 131c that connects between the first longitudinal side part 131a and the second longitudinal side part 131b, and side plate parts 131d, 131e, 131f and 131g provided on both ends of the first longitudinal side part 131a and both ends of the second longitudinal side part 131b, respectively, and extending in the direction approximately orthogonal to the first longitudinal side part 131a and the second longitudinal side part 131b.

The material of the sealing member 130 according to the present embodiment is phenol resin and so forth. Here, the material of the sealing member 130 is not limited to phenol resin, but, for example, glass nylon and rubber are possible.

In this way, the suction passageway groove 111 is formed on the inner surface of the valve operating chamber cover 100 and covered with the sealing member 130, and therefore it is possible to easily form the suction passageway 110.

In addition, the sealing member 130 covers only the circumference of the suction passageway groove 111, so that it is possible to form suction passageway 110 without reducing the capacity of the interior of the valve operating chamber cover 100.

Next, the lubricating device that lubricates the inside of the four-stroke engine 10 according to the present embodiment with oil, will be described with reference to FIG. 2. In the present embodiment, a first oil feeding passageway 50 to feed oil A from the oil tank 15 to the crankcase 13 is provided between the oil tank 15 and the cylinder block 12. In addition, a suction part 51 to suck oil A accumulated in the oil tank 15 is mounted on one end of the first oil feeding passageway 50 in the oil tank 15 side.

The suction part 51 has a flexible tube 51a made of an elastic material such as rubber, and a weight 51b provided on the tip of the tube 51a and having a suction port to suck oil A. The weight 51b in the suction part 51 can move in the vertical direction due to its own weight. Therefore, the weight 51b can always sink in oil A even if the oil tank 15 is tilted.

In addition, a one-way valve 52 that makes oil A flow through the first oil feeding passageway 50 in only one direction, is provided in the way of the first oil feeding passageway 50. This one-way valve 52 is configured to open and close in response to a change in the pressure in the crank chamber 13a.

To be more specific, in a state in which the pressure in the crank chamber 13a is lower than the pressure in the oil tank 15, the one-way valve 52 is open to allow the first oil feeding passageway 50 to communicate with the crank chamber 13a. On the other hand, in a state in which the pressure in the crank chamber 13a is higher than the pressure in the oil tank 15, the one-way valve 52 is closed not to allow the first oil feeding passageway 50 to communicate with the crank chamber 13a.

In addition, a second oil feeding passageway 60 is provided between the oil tank 15 and the crank case 13 to feed mist oil resulting from misting oil in the crank chamber 13a (including oil resulting from liquefying mist oil) to the oil tank 15.

A reed valve 61 that can open and close in response to a change in the pressure in the crank chamber 13a is provided on an end part 60a of the second oil feeding passageway 60 in the crank chamber 13a side. This reed valve 61 opens at a positive pressure in the crank chamber 13a when the piston 11 moves toward a bottom dead center to allow the crank chamber 13a and the oil tank 15 to communicate with one another. That is, the mist oil in the crank chamber 13a is fed to the oil tank 15 through the second oil feeding passageway 60.

An end part 60b of the second oil feeding passageway 60 in the oil tank 15 side is positioned to open at approximately the center of the oil tank 15. Therefore, even if the level of the surface of oil A varies, which is stored in an amount equal to or lower than a specified value, the end part 60b of the second oil feeding passageway 60 in the oil tank 15 side is positioned not to get under the surface of oil regardless of how the oil tank 15 tilts.

In addition, a first supply passageway 70 to supply oil to the valve operating mechanism chamber 20 is provided between the oil tank 15 and the valve operating mechanism chamber 20. An end part 70a of the first supply passageway 70 in the oil tank 15 side is positioned to open at approximately the center of the oil tank 15 like the second oil feeding passageway 60. Therefore, even if the level of the surface of oil A varies, which is stored in an amount equal to or lower than a specified value, the end part 70a of the first oil feeding passageway 70 in the oil tank 15 side is positioned not to get under the surface of oil regardless of how the oil tank 15 tilts.

In addition, the end part 70a of the first supply passageway 70 in the oil tank 15 side is positioned further back than the end part 60b of the second oil feeding passageway 60 in the oil tank side in the direction in which the second oil feeding passageway 60 feeds oil. By this means, it is possible to prevent the mist oil discharged from the second oil feeding passageway 60 from directly entering the end part 70a of the first supply passageway 70 in the oil tank 15 side. That is, the end part 60a serves as an inflow prevention part that prevents mist oil discharged from the second oil feeding passageway 60 from flowing into the end part 70a of the first supply passageway 70. Therefore, the concentration of the mist oil flowing through the first supply passageway 70 is lower than that of the oil flowing through the first oil feeding passageway 50.

In the present embodiment, the breather passageway 103 is provided on the inner surface of the valve operating chamber cover 100. The breather passageway 103 serves to discharge blowby gas to the combustion chamber.

The other opening end 103b of the breather passageway 103 is connected to an air cleaner 72. That is, the blowby gas residing in the valve operating chamber 30 is supplied to the air cleaner 72 via the breather passageway 103.

The blowby gas supplied to the air cleaner 72 is separated into gas and liquid by an oil separator 73, that is, separated into mist oil and blowby gas. The opening end 103a of the breather passageway 103 is open at approximately the center of the valve operating chamber 30, and therefore does not to suck the liquefied mist oil remaining in the valve operating chamber 30.

In addition, a one-way valve is provided at the other opening end 103b of the breather passageway 103 and prevents blowby gas and mist oil from flowing backward and from the air cleaner 72 to the valve operating chamber 30 side.

The oil having been separated into gas and liquid is supplied to the crank chamber 13a through a reflux passageway 74 that allows the air cleaner 72 and crank chamber 13a to communicate with one another. One-way valve 74a that allows oil to flow in one direction is provided in the reflux passageway 74. This one-way valve 74a serves to allow oil to flow toward only the crank chamber 13a side.

In addition to the breather passageway 103, a suction passageway 110 to suck oil in the valve operating chamber 30 is provided on the inner surface of the valve operating chamber cover 100. The suction passageway 110 has opening end parts 110d, 110e, 110f and 110g extending to the mounting surface of the valve operating chamber cover 100 and opening, which are located at a level lower than the opening end part 103a in the breather passageway 103.

Then, these opening end parts 110*d*, 110*e*, 110*f* and 110*g* are located in the four corners of the top plate part 101 in the valve operating chamber cover 100. As described above, these opening end parts 110*d*, 110*e*, 110*f* and 110*g* in the suction passageway 110 according to the present embodiment are located at a level lower than the opening end part 103*a* in the breather passageway 103, and also located in the four corners of the top plate part 101 in the valve operating chamber cover 100. This prevents the oil liquefied in the valve operating chamber 30 from entering the breather passageway 103.

A communication hole 112*a* connected to the third oil feeding passageway 80 to feed the oil having been sucked by this suction passageway 110 to the crank chamber 13*a*, is formed in the suction passageway 110. As described above, the third oil feeding passageway 80 is provided to feed the oil having been sucked by the suction passageway 110 to the crank chamber 13*a* and has the opening end part 80*a* facing the crank chamber 13*a*. The opening end part 80*a* is positioned to fully open at the time the piston arrives at the upper dead center, like the first oil feeding passageway 80.

Here, a one-way valve may also be provided in the third oil feeding passageway 80 to control oil to flow in one direction from the valve operating chamber 30 to the crank chamber 13*a* side. In this way, by providing a one-way valve, it is possible to prevent oil from flowing backward and from the crank chamber to the valve operating chamber 30.

In addition, a return passageway 90 to return the oil in the valve operating mechanism chamber 20 to the crank chamber 13*a* is provided between the valve operating mechanism chamber 20 and the crank chamber 13*a*. When a negative pressure is created in the crank chamber 13*a*, the return passageway 90 returns lubricating oil to the crank chamber 13*a*.

On the other hand, when a positive pressure is created in the crank chamber 13*a*, the reed valve 61 in the second oil feeding passageway 60 opens to allow the crank chamber 13*a* and the oil tank 15 to communicate with one another, and therefore, the mist oil in the crank chamber 13*a* is supplied to the oil tank 15. As a result of this, lubricating oil rarely flows backward and from the crank chamber 13*a* to the valve mechanism chamber.

In addition, a flow control passageway 91 is provided between the valve operating mechanism chamber 20 and the first oil feeding passageway 50. This flow control passageway 91 serves to control the flow rate of oil supplied to the crank chamber 13*a* via the first oil feeding passageway 50 by sucking the air in the valve operating mechanism chamber 20.

As described above, the flow control passageway 91 has one end connected to the valve operating mechanism chamber 20 and the other end connected to the fist oil feeding passageway 50. The flow control passageway 91 is connected to the first oil feeding passageway 50 such that a distance between the connecting location and the oil tank 15 is shorter than a distance between the connecting location and the one-way valve 52 provided in the first oil feeding passageway 50.

Therefore, when the first oil feeding passageway 50 is blocked with the one-way valve 52 in the first oil feeding passageway 50, oil remains in the connecting location between the flow control passageway 91 and the first oil feeding passageway 50. By this means, the first oil feeding passageway 50 allows not only air but also oil to flow through and be supplied to the crank chamber 13*a*.

In addition, a flow restrictor 92 that controls the flow rate of air supplied from the valve operating mechanism chamber 20 to the first oil feeding passageway 50, is provided in the flow control passageway 91.

For example, an increase in an amount of air being sucked allows a decrease in the flow rate of oil being supplied to the first oil feeding passageway 50. On the other hand, a decrease in an amount of air being sucked allows an increase in the flow rate of oil being supplied to the first oil feeding passageway 50. That is, it is possible to easily control the flow rate of oil by a design of the flow control restrictor 92 without taking into account the inner diameter of the flow control passageway 91.

As described above, the lubricating device in the four-stroke engine 10 according to the present embodiment has the first oil feeding passageway 50, the second oil feeding passageway 60, the first supply passageway 70, the second supply passageway 71, the suction passageway 110 and the third oil feeding passageway 80, and can lubricate the crank chamber 13*a*, the valve operating mechanism chamber 20 and the valve operating chamber 30 with oil.

As described above, even if the four-stroke engine has the cylinder block 12 and the cylinder head 14 formed separately, it is possible to form the suction passageway 110 without restrictions of bolts and so forth for mounting the cylinder head 14 to the cylinder block 12.

Here, the four-stroke engine 10 according to the present embodiment can be used in, in particular, a portable working machine such as a brush cutter, a hedge trimmer, a chainsaw and a handheld blower, a backpack working machine such as a backpack blower and an atomizer, and mobile working machine such as a farm tractor, a truck, a groove cutting machine for paddy fields and a concrete cutter.

The invention claimed is:

1. A lubricating device for a four-stroke engine that circulates oil while lubricating each part in a valve operating chamber and a crank chamber, the valve operating chamber accommodating an intake valve and an exhaust valve, by supplying the oil to the valve operating chamber and the crank chamber using pressure fluctuation in the crank chamber, the pressure fluctuation being caused by reciprocating motion of a piston, and discharges blowby gas contained in a circulation path through which the oil circulates, from the valve operating chamber to a combustion chamber via a breather passageway connected to the valve operating chamber, wherein:
   the valve operating chamber is formed by mounting a valve operating chamber cover; and
   a suction passageway that sucks the oil in the valve operating chamber is provided by forming a groove on an inner surface of the valve operating chamber cover and sealing the groove with a sealing member shaped to fit the groove.

2. The lubricating device for a four-stroke engine according to claim 1, wherein:
   the valve operating chamber cover has a top plate part and is shaped as a cap by providing a side plate part along a periphery of the top plate part; and
   a rim formed at a border between the top plate part and the side plate part serves as the groove.

3. The lubricating device for a four-stroke engine according to claim 1, wherein:
   the valve operating chamber cover has a top plate part having an approximately polygonal shape and is shaped as a cap by providing a plurality of side plate parts along a periphery of the top plate part; and
   a rim formed at a boundary between neighboring side plate parts serves as the groove.

4. The lubricating device for a four-stroke engine according to claim 1, wherein an opening of the suction passageway is formed near a surface on which the valve operating chamber cover is mounted.

5. The lubricating device for a four-stroke engine according to claim 1, wherein the groove has a step part and is sealed by fitting the sealing member into the step part.

6. A lubricating device for a four-stroke engine that circulates oil while lubricating each part in a valve operating chamber and a crank chamber, the valve operating chamber accommodating an intake valve and an exhaust valve, by supplying the oil to the valve operating chamber and the crank chamber using pressure fluctuation in the crank chamber, the pressure fluctuation being caused by reciprocating motion of a piston, and discharges blowby gas contained in a circulation path through which the oil circulates, from the valve operating chamber to a combustion chamber via a breather passageway connected to the valve operating chamber, the combustion chamber being formed by a cylinder head and a cylinder block provided as separate parts, wherein:

the cylinder head and the cylinder block are coupled via a mounting part;

the valve operating chamber is formed by mounting a valve operating chamber cover on the cylinder head avoiding the mounting part; and a suction passageway to suck the oil in the valve operating chamber is provided by forming a groove on an inner surface of the valve operating chamber cover and sealing the groove with a sealing member shaped to fit the groove.

* * * * *